United States Patent
Eisele et al.

(10) Patent No.: US 8,401,790 B2
(45) Date of Patent: Mar. 19, 2013

(54) COMPUTING-TIME-EFFICIENT ROUTE DETERMINATION ALONG SEVERAL PRESET PATH POINTS WITH GIVEN CONNECTING ROUTES IN-BETWEEN

(75) Inventors: Matthias Eisele, Burtenbach (DE); Winfried Lohmiller, Freising (DE); Dieter Noetzold, Salem (DE); Gregoire Verlut, Munich (DE)

(73) Assignee: EADS Deutschland GmbH, Ottobrunn (DE)

( * ) Notice: Subject to any disclaimer, the term of this patent is extended or adjusted under 35 U.S.C. 154(b) by 551 days.

(21) Appl. No.: 12/575,923

(22) Filed: Oct. 8, 2009

(65) Prior Publication Data
US 2010/0106398 A1 Apr. 29, 2010

(30) Foreign Application Priority Data
Oct. 10, 2008 (DE) .......................... 10 2008 050 952
Mar. 30, 2009 (DE) .......................... 10 2009 014 978

(51) Int. Cl.
*G01C 21/34* (2006.01)
*G06F 17/10* (2006.01)

(52) U.S. Cl. ........ 701/528; 701/3; 701/420; 340/995.19

(58) Field of Classification Search .................. 701/528, 701/410, 420, 465, 3; 340/995.19, 995.23
See application file for complete search history.

(56) References Cited

U.S. PATENT DOCUMENTS

| | | | | |
|---|---|---|---|---|
| 6,016,485 A * | 1/2000 | Amakawa et al. | ............ | 705/400 |
| 6,675,093 B1 * | 1/2004 | Childs et al. | .................. | 701/428 |
| 6,965,944 B1 * | 11/2005 | Soga | ............................ | 709/238 |
| 2005/0256639 A1 * | 11/2005 | Aleksic et al. | ................ | 701/210 |
| 2006/0167601 A1 | 7/2006 | Henning et al. | | |
| 2010/0036606 A1 * | 2/2010 | Jones | ............................ | 701/202 |
| 2010/0076674 A1 * | 3/2010 | Berot et al. | .................... | 701/200 |
| 2010/0189015 A1 * | 7/2010 | Bragg et al. | .................. | 370/256 |

FOREIGN PATENT DOCUMENTS

| | | |
|---|---|---|
| DE | 10 2004 061 636 A1 | 7/2006 |
| EP | 1 065 470 A1 | 1/2001 |
| EP | 2 031 350 A1 | 3/2009 |

\* cited by examiner

*Primary Examiner* — Tan Q Nguyen
(74) *Attorney, Agent, or Firm* — Crowell & Moring LLP

(57) ABSTRACT

A process for determining a route along more than two mutually consecutive preset path points with given connecting routes in-between. In this case, a plurality of connecting routes is given between at least one pair of two mutually consecutive path points. Respective costs and preferably also a respective time duration are assigned to each connecting route. In a first step of the process, a tree is generated which comprises edges and nodes connected by edges. Each node is assigned to a defined path point and each edge corresponds to a connecting route. The route is determined based on a selection of edges of the tree.

19 Claims, 4 Drawing Sheets

COMPUTING-TIME-EFFICIENT ROUTE DETERMINATION ALONG SEVERAL PRESET PATH POINTS WITH GIVEN CONNECTING ROUTES IN-BETWEEN

This application claims the priority of German patent document 10 2008 050 952.3-54, filed Oct. 10, 2008 and German patent document 10 2009 014 978.3, filed Mar. 30, 2009, the disclosures of which are expressly incorporated by reference herein.

The invention relates to a process for determining or planning a flight plan, with minimized computing.

In addition to start and destination points, additional path points may be present along the route of a vehicle (for example, an airplane, an unmanned aerial vehicle ("UAV"), an automobile, a surface ship or a submarine). Moreover, several possible connecting routes, having different costs associated therewith, frequently exist between the individual path points. In this case, the costs provide the optimization quantity for the route planning. In the case of military aircraft, costs may, for example, indicate the risk potential that should be expected on the respective connecting routes: the higher the costs, the more dangerous the route.

The costs of a route may be modeled, for example, by a heuristic function. This function may, among other things, take into account the elevation of the terrain, the position and the type of the enemy's radar stations, the positions of no-fly zones/corridors (must-fly zones) and additional parameters influencing the risks of the route. The connecting routes typically also have different time durations.

Connecting routes may be obtained by route planning between two path points, for example, by extraction from a Voronoi Graph (see Yeonju Eun, Hyochoong Bang (2004), "Cooperative Control of Multiple UCAVs for Suppression of Enemy Air Defense", AIAA 3rd "Unmanned Unlimited" Technical Conference, Workshop and Exhibit, AIAA, Illinois). As an alternative, connecting routes can be obtained by merging two Dijkstra trees (see Verlut Grégoire, "Onboard Low-Level Flight Planning for Turboprop Transport Aircraft", Chapter 4, Dissertation, Braunschweig). The disclosure content of the above-mentioned documents concerning the determination of connecting routes, which is known to those skilled in the art, is hereby included by reference in the disclosure content of the application.

The computation required for generation of connecting routes is very time intensive; whereas the storage requirement for the result nowadays does not present a problem.

Therefore, according to the present invention, the problem of route planning is divided into two sub problems: First, several optimized connecting routes are computed between individual consecutive path points, taking into account, for example, low-elevation terrain or no-fly zones, corridors and threats at all altitudes. Thereafter, a selection is made from all these available connecting routes. This can take place within a short computing time.

It is therefore one aspect of the invention to determine a route along more than two mutually consecutive preset path points, starting from given (previously computed) connecting routes, with the respective costs. In this case, more than two connecting routes frequently exist between two mutually consecutive path points; and it is therefore suggested that the total route be determined by selecting the connecting routes.

This has the advantage that a major part of the computation can commence before starting the route, and a second optimization along the entire route can then take place in real time. As a result, the computing time during the drive or the flight can be considerably reduced. Although the storage requirement is typically increased, this no longer presents a problem in view of today's storage capacities (in contrast to computing capacities).

It is also possible to replace only individual connecting routes between two path points during the drive or in flight if something has changed (for example, the no-fly zones or the radar stations). For a total optimization, all connecting routes would always have to be newly computed in this case.

The process according to the invention can be used to reach one path point, several path points or even all path points within a preset time (or in a preset time interval) at minimal cost.

According to an embodiment of the invention, the route determination has two steps (or two components): In a first step, an erected tree is constructed starting the efficient connecting routes and the path points. In a second step, an efficient route is extracted from the tree, particularly by backward computation.

Such a tree comprises edges, and nodes connected by edges, each node being assigned to a defined path point, and each edge corresponding to a special connecting route. After such a tree has been generated, the route can be determined based on a selection of edges of the tree.

This process has the advantage that based on already preset connecting routes only one tree needs be produced. This can take place at low computation expenditures, particularly in the respective aircraft (for example, an airplane, helicopter, drone, or missile) or other vehicle for which the route is determined. The computation intensive determination of connecting routes can be performed before the beginning of the route determination and/or outside the vehicle: for example, before the mission in a separate computer, or during the mission at a ground station with a higher computing capacity.

Preferably, in addition to the costs, a time period is assigned to each efficient connecting route. In this case, "efficient" relates to an optimal route for a given marginal condition, such as time.

In this case, the nodes are preferably arranged along the sequential path points and the time condition to be optimized. In other words, the generated tree has a plurality of tree levels on which the nodes are distributed. The nodes of a tree level are assigned to a common path point, and different nodes of a tree level are assigned to different time data.

Different values of another characteristic as a condition of a path point, such as flight attitude or track angle, can also be assigned to nodes of a tree level. The nodes can therefore also be arranged according to a flight altitude condition to be optimized, or a track angle condition to be optimized.

Several nodes are therefore frequently assigned to a path point, in which case each node is characterized by a time indication, for example, the arrival time at the path point or the time duration until the path point is reached. However, the time condition is only one example: the condition can also be implemented as a flight plan ID (Mainplan, BackUpPlan1, BackupPlan2, escape . . . ). Time conditions at a path point would then correspond to a flight plan ID.

Alternative examples of the condition are flight altitude or track angle. Each node of a path point therefore could be assigned to a defined flight altitude or a defined track angle, instead of a defined time indication.

Known trees used for determining a connecting route typically have a very large number of nodes. In comparison, the number of nodes is typically smaller in the case of the tree according to the invention. The time can therefore be taken into account as a tree dimension while the tree does not become too large for available computational capacities.

A node-specific time indication as a condition (for example, the time duration, particularly the time duration of the root node or a reference point to the respective node), node-specific costs (particularly the total costs from the root node or a reference point to the respective node) and a reference to the preceding node are advantageously stored in each respective node. The stored reference to the preceding node is advantageously that reference by way of which the respective time indication (for example, the respective total time duration to the next node) can be achieved in the most favorable manner (i.e. at the lowest cost). Instead of a node-specific time indication as a condition, a condition such as the flight altitude or track height can be stored in the respective node.

A connecting route index, for example, can be used as the reference; or alternatively, the total time duration of the preceding node or the node number (in the case of a continuous numbering of the nodes) of the preceding node can be used for that purpose.

The tree is preferably generated iteratively. For example, the optimization can start with the first path point, and can then iteratively change to the path point that is next with respect to time. Alternatively, the optimization may start at the path point that is last with respect to time, and then change to the path point that is preceding with respect to time. The tree can therefore be generated with or against the driving/flying direction.

In the case of an iteration, new nodes of a path point that follows in the tree can be determined by combining different nodes of a common path point (in other words, different time indications of the path point) with the different connecting routes to the path point that follows. However, the nodes of the subsequent path point advantageously have the lowest node-specific costs for the individual time indications. Thus, if the same time indications are obtained for a path point as a result of different combinations, typically only the combination that is more favorable with respect to the costs for this time indication will be stored in the tree.

A time demand exists preferably at least for one of the path points (such as a point in time or a time interval), for example, for the first and the last path point of the tree. In the case of a condition other than time (for example, flight altitude or track angle), instead of time demands, other demands could also exist for the path point or points, such as a flight altitude demand or a defined demanded track angle.

The tree is advantageously constructed up to a path point that has such a time demand. A time, several time periods or a range of times is preferably selected there which matches the time demand as closely as possible (in addition to the time, the costs can also be taken into account here and the time and the costs can be weighed with respect to one another). One or more of the nodes of a path point characterized by their time data are thereby selected as a function of the time demand for this path point.

The tree is advantageously continued only by the selected node or nodes of a path point; the other nodes of the level advantageously become so-called leaves of the tree. If several nodes are selected, an optimization as described above is carried out. That is, the tree is iteratively continued from this node as described above.

The determination of the route in the second process step is based on the tree determined in the first process step. In this case, a node of that level (i.e., that path point) of the tree is advantageously selected, which is the last for which a time demand is present. This may (but need not necessarily) be, for example, the last level of the tree.

The selection takes place by comparing the time demand with the time data of the nodes at this level. For example, in the second step, at the last level, the node is determined which corresponds as well as possible to the time demand and optionally preset costs. By going back from this node to the root, the route connections (i.e., the route sections) can then be selected. Thus, the edges of the tree are selected from the selected node to the root node. This takes place by utilizing stored references. The second process step therefore advantageously utilizes the storage of the reference to the preceding node.

In addition to the above-described process, the invention has as its object a corresponding system for determining the route. The preceding statements concerning the process can correspondingly also be applied to the system. Such a system may, for example, be part of an onboard computer of an aircraft (such as an airplane, a drone, a helicopter or a missile). The route determined by the system can be used as an input variable of the control unit of the aircraft, for example, for controlling the autopilot.

In addition, the invention also provides a data carrier containing data of computed connecting routes between several path points (preferably more than two path points). Based on this data carrier, the route determination can then be carried out as described above. An aircraft preferably has a device for reading out this data carrier.

Another aspect of the invention has as its object a process for determining a route along more than two mutually consecutive preset path points, by determining connecting routes between a first pair of two path points independently of the determination of other connecting routes between other pairs of path points. The determination of the route is based on the connecting routes of the more than two mutually consecutive path points.

The computation-time-intensive connecting routes may be determined, for example, before the mission in a separate computer, or during the mission at a ground station with a higher computation capacity.

The process of route determination is therefore disassembled into a plurality of subtasks which can be solved independently from one another. When the conditions between two path points change, for example, the position of radars between the path points, the connecting routes between the other path points need not be newly computed; rather, only one, several or all connecting routes between the two path points are newly determined.

Connecting routes between the first pair of path points can therefore be newly determined, and the route can be newly determined based on the newly determined connecting routes. As stated above, it is not necessary in this case that the other connecting routes be newly determined.

Other objects, advantages and novel features of the present invention will become apparent from the following detailed description of the invention when considered in conjunction with the accompanying drawings.

DETAILED DESCRIPTION OF THE DRAWINGS

Figure 1:
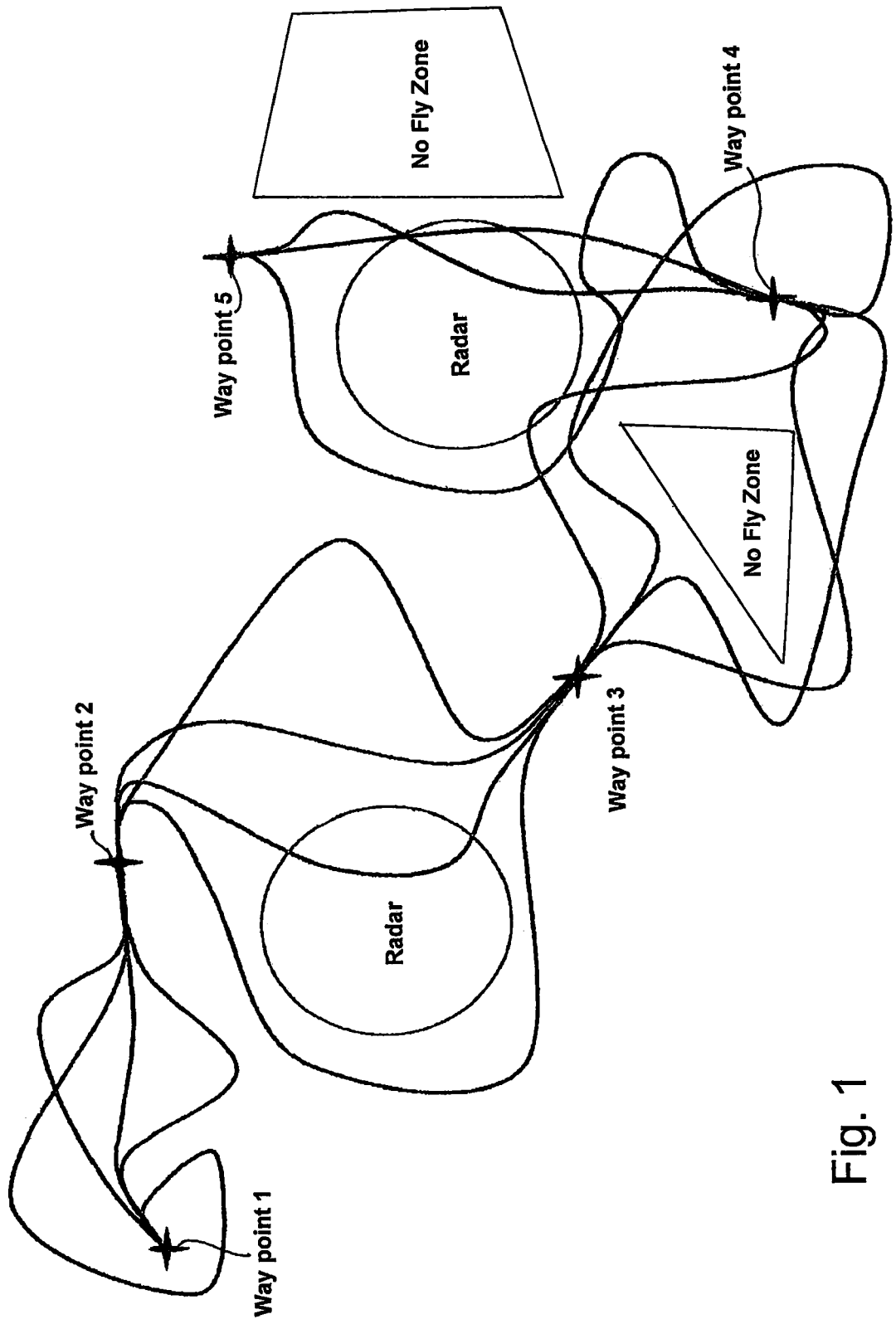
FIG. 1 shows an example of computed connecting routes between five path points.

FIG. 1 illustrates an example of computed connecting routes between five different path points 1 to 5 of a route. A plurality of connecting routes was computed between each pair of two mutually consecutive path points 1 to 5. These are computed connecting routes for an aircraft, such as an airplane, a helicopter, a drone, a missile or the like. In this example, radars 6, 7 were taken into account for the computation of different connecting routes. (A military mission typically involves enemy radar stations.) Furthermore, so-called no-fly zones 8, 9 (i.e., zones through which a flight must not take place) were taken into account.

Because of the increased risk of being shot down when flying through radar-monitored regions, high costs occur during a flight through radars 6, 7 because the danger to the aircraft increases. The illustrated connecting routes therefore tend to avoid the radars 6, 7. No-fly zones prohibit flying, so that the computed connecting routes do not lead through these zones 8, 9. Typically, every connecting route between two path points 1 to 5 has a different flight duration.

In the process according to the invention for the planning of the route, time allowances (for example, a preset point in time or a preset time interval) are advantageously taken into account for one or more path points 1 to 5, it is endeavored to achieve these time allowances at costs that are as low as possible.

For planning the optimal route, when possible connecting routes are given between 2 path points respectively having different costs and durations, the process makes it possible to make a selection of the connecting routes such that time allowances given for one, several or even all path points are fulfilled with the lowest possible time deviation at the lowest possible cost.

According to an embodiment of the process for determining a route according to the invention, a tree is constructed from the connecting routes illustrated as an example in FIG. 1, which tree takes into account the time duration as well as the costs of the individual connecting routes.

The invention advantageously solves the optimization problem by means of two components: The first component constructs the above-mentioned erected tree; the second extracts the efficient route therefrom, which takes place by backward computation. During the construction of the erected tree, the nodes of the tree arrange themselves not only along the sequential path points but also along the time duration condition to be optimized.

Figure 2:
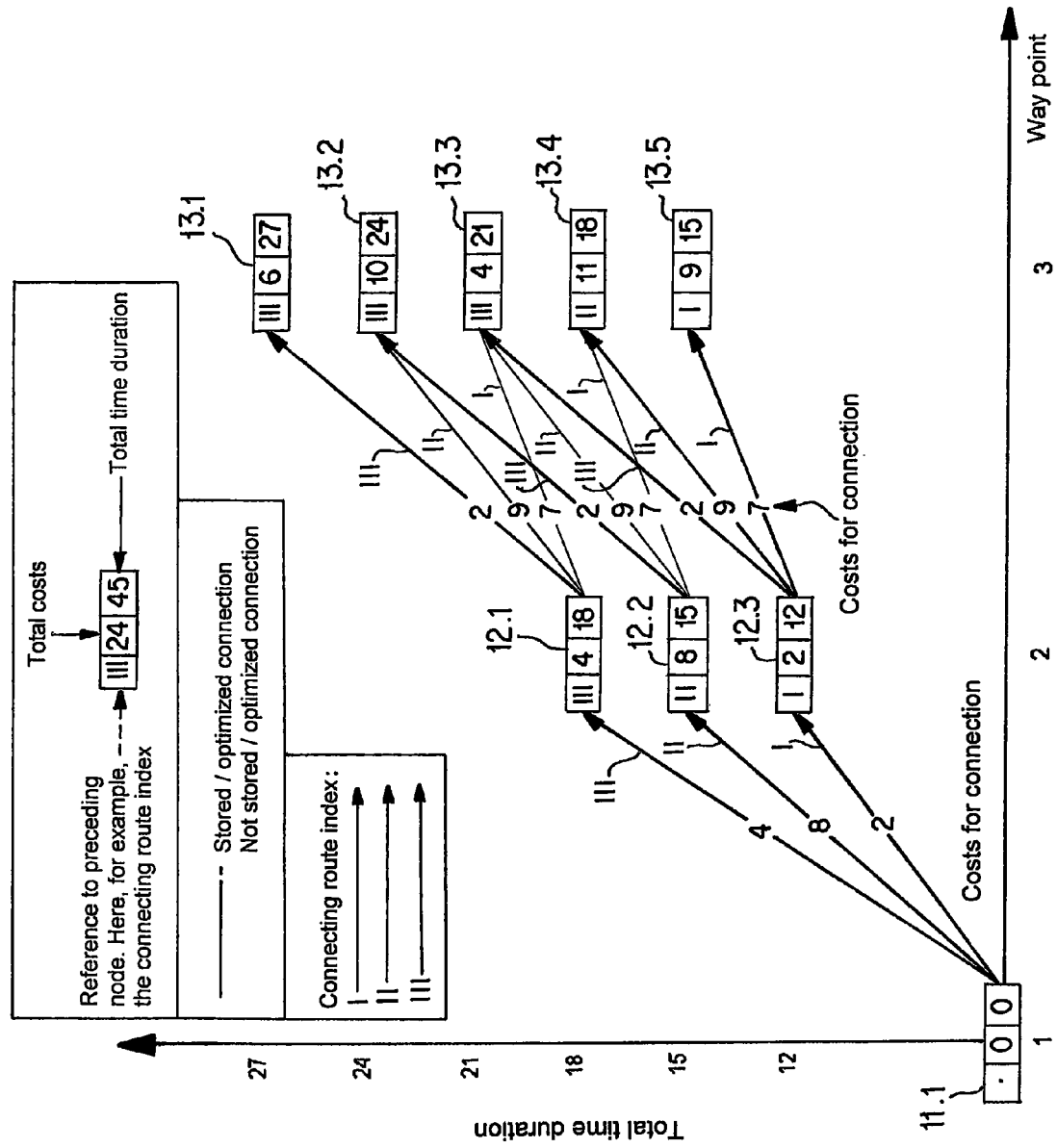
FIG. 2 is a view of an example of a tree according to an embodiment of the invention.

FIG. 2 shows an example of such a tree according to an embodiment of the invention, which was built up sequentially from the first path point to the last path point. It comprises the node 11.1 at the first tree level, the nodes 12.1-12.3 at the second tree level and the nodes 13.1-13.5 at the third tree level. In this case, the node 11.1 forms the root node of the tree. The nodes from one path point to the next are connected by way of edges which correspond to the given connecting routes between the respective path points. The time duration condition (here, the total time duration) is in each case stored in the nodes. In addition, the costs (here, the total costs) and the reference to the respective preceding node are also stored in these nodes. Instead of the time duration condition, a flight altitude condition or track angle condition could be stored.

According to FIG. 2, a total of three possible connecting routes exist between path points 1 and 2, which connecting routes have costs in the amount of 4, 8 and 2 respectively and time durations amounting to 18, 15 and 12 respectively (viewed in a downward-directed sequence). Node 11.1 of path point 1 is therefore connected with the three nodes 12.1-12.3 of path point 2 by way of three edges which correspond to these connections. The resulting total time duration (from the root node to the respective node), the total costs and the reference to the preceding node are in each case stored in the three nodes 12.1-12.3 of path point 2. In nodes 12.1-12.3, the first illustrated statement in each case corresponds to the reference; the second illustrated statement in each case corresponds to the total costs; and the third illustrated statement in each case corresponds to the total time duration. Here, the reference advantageously is a connecting route index: The indexes "I", "II" and "III" each mark the first, second and third connecting route respectively between two path points (illustrated in FIG. 2 in an upward-directed sequence). The routes between two path points are therefore assigned to an index.

Instead of using the connecting route index as the reference, the reference may be the total time duration of the preceding node or the node number (when the nodes are continuously numbered) of the preceding node. For example, the first node 12.1 for path point 2 has the stored values "III", "4" and 18". Thus, this node is connected with the preceding node 11.1 by way of connecting route III, in which case total costs in the amount of 4 and a total time duration of 18 are obtained for node 12.1.

Based on nodes 12.1-12.3 of path point 2, new nodes of the subsequent path point 3 are determined in the next iteration in that the nodes 12.1-12.3 of the path point are combined with the connecting routes to path point 3 that follows. Here, attention is paid to the fact that the nodes of the path point that follows have the lowest node-specific costs for the individual time indications. Thus, if identical time indications are obtained for path point 3 as a result of different combinations, typically only the combination which is more favorable with respect to the costs will be stored in the tree.

This is true, for example, in FIG. 2 at node 13.2. Starting out from node 12.1 by way of connecting route III with the connecting-route-specific duration 9 and the costs 2, the total time duration of 24 of node 13.2 can be achieved. (See thick line from node 12.2 to node 13.2.) A total time duration of 24 can also be achieved starting out from node 12.1 by way of connecting route II with the connecting-route-specific duration 6 and the costs 9. (See thin line from node 12.1 to node 13.2.) However, in the case of this combination, the total costs in the amount of 13 (=4+9) are higher than the total costs in the amount of 10 (=8+2) of the above-mentioned combination, so that the connecting route index III is stored as reference in node 13.2. The thereby referenced preceding node 12.2 can be determined, for example, in the backward direction by subtracting the duration (here 9) of the stored connecting route III from the total time duration amounting to 24 in node 13.2. The resulting total time duration 15 indicates that node 12.2 is the preceding node.

In nodes 13.1-13.5, the stored reference to the preceding node is therefore always the reference by which the respective total time duration of the node can be reached at the lowest cost.

Thus, for constructing the tree, the route with the most favorable total costs is computed for every conceivable route combination between two path points for every condition (i.e., for any of the conceivable time durations) and is then stored with the reference to the predecessor and the total time duration.

The tree is constructed up to a path point that has a time demand (for example, a point in time, a time duration or a time interval). Preferably a time, several time periods or a range of times is selected there which matches the time demand nearly as possible. (In this case, in addition to the time, the costs can also be taken into account so that, for example, the time or time range is selected that is best with respect to the time allowance and costs.) A selected time corresponds to a node with the corresponding time indication.

If several nodes are selected, optimization will be carried out as described above. That is, the tree is iteratively continued from this node. In this case, the tree is continued only from the selected node or nodes of a path point; the other nodes of the level become so-called leaves of the tree.

After the construction of the tree, the second component will be used, which requires the tree built in the first component. A node of that level (i.e., that path point) of the tree is determined for which a time demand exists as the last level, typically for the last level of the tree. Preferably the node is selected which best corresponds to the time demand and/or a cost allowance. The deviation from the time demand and the total costs can be assessed using an optimization function, which can be minimized. By going back from the selected node to the root, the route sections between the path points will then be selected. In this case, the second component utilizes the storage of the reference to the preceding node. This reference corresponds to the route section piece selected next. If, for example, in FIG. 2, a duration of 24 is demanded for path point 3 (as the assumed last path point), node 13.2 will be selected. By going back to the root node 11.1, the connecting route with the index III between path point 2 and path point 3 and the connecting route with the index II between path point 2 and path point 1 will then be obtained.

It should be observed that the tree does not necessarily have to be computed for the total route. For example, the tree can be determined only between a first path point with a time demand and a last path point with a time demand, the first and/or the last path point with a time demand being followed by additional path points (for example, the starting point and/or the landing point). Thus, it may, for example, be demanded that aircraft arrive at a certain point in time at a first path point with a time demand, in which case no demands are made on the starting point in time. The starting point in time is then obtained by the simple selection of the route connection between the starting point and the first path point with a time demand that has the lowest costs. In this case, the tree could be determined starting from this first path point with a time demand, instead of starting from the starting point. (In this case, not the starting point but the first path point with a time demand corresponds to the root node 11.1 in FIG. 2.)

Likewise, it could happen that no time demand exists for the landing point, and a time demand exists only for a path point before the landing point. In this case, the tree needs not necessarily be determined up to the landing point; rather, it can be discontinued after the last path point with a time demand. Furthermore, it is possible to also include such additional path points without a time demand (for example, a starting and landing point without a time demand) outside the interval between the first path point with a time demand and the last path point with a time demand in the tree. Preferably, the tree is determined between the first path point with a time demand and the last path point with a time demand.

Figure 3:
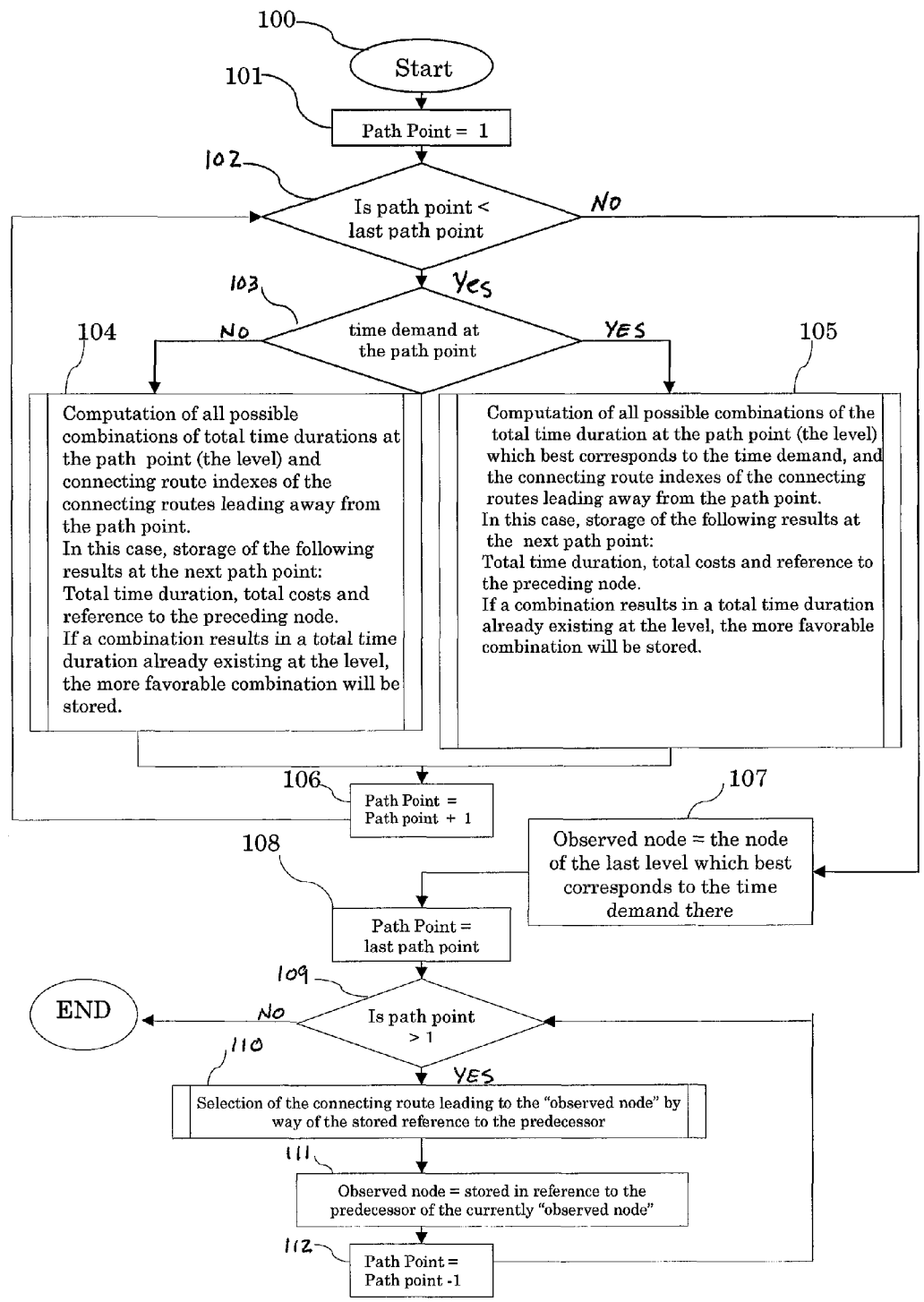
FIG. 3 is a flow chart that shows an embodiment of the process for the route determination according to the invention.

FIG. 3 is a flow chart that illustrates the process for determining a route according to an embodiment of the invention. The process starts in Step 100. In Step 101, the observed path point is set on path point 1. In Step 102, it is checked whether the currently observed path point is smaller than the last path point. If so, it is checked in Step 103 whether a time demand is made for the path point.

If no time demand is made for the current path point, all conceivable combinations of total time periods at the observed path point (i.e., at the observed level) and connecting route indexes of the connecting routes leading away from the path point are computed. That is, every combination consists of a total time duration of a node and a connecting route index. The resulting combinations correspond, for example, to the totality of the connections illustrated in FIG. 2 between path point 2 and path point 3 (thus, the connections indicated by a thick as well as by a thin line). In this case, the following results are stored at the next path point (i.e., at the next level of the tree): The resulting total time duration, the total costs and the reference to the preceding node. If a combination results in a total time duration which already exists in the newly computed level of the tree, only the combination with the lower costs will be stored. These respectively more favorable combinations are characterized in the tree in FIG. 2 by the thickly drawn connections; the rejected combinations with the respectively higher costs are outlined in FIG. 2 by the thinly drawn lines.

If, in contrast, it is determined in Step 103 that a time demand is made for the current path point, not all total time durations (i.e., not all nodes of the path point) are taken into account in Step 105 for the determination of the nodes of the next path point. Only one or more total time durations which correspond to the time demand of the path point are taken into account. Here, for example, only a total time duration which corresponds most closely to the time demand at the path point can be taken into account. As an alternative, several total time durations may also be taken into account, for example, the best N total time durations or, in the case of a demanded time interval, the total time durations which are within the time interval. Therefore, for example, only the combinations consisting of the total time duration corresponding most closely to the time demand at the path point and of the connecting route indexes of the connecting routes leading away from the path point are computed in Step 105. The remaining partial steps in Step 105 correspond to those of Step 104.

After therefore, by way of Step 104 or alternatively by way of Step 105, the nodes of the next path point have been computed, in Step 106 the index of the current observed path point will be increased by 1.

The tree will be iteratively generated in the above-described manner until the currently observed path point corresponds to the last path point; the tree has therefore been computed to the last path point. In this case, the "no" alternative is obtained in query 102, and the generating of the tree is concluded.

In the subsequent Step 107, the node of the last tree level which most closely corresponds to the time demand is selected, and is now the observed node. Instead of carrying out the selection based solely on whether the time demand corresponds as closely as possible with the time demand of the last level, the total costs can also be taken into account for the selection.

According to Step 108, the last path point is defined as the current path point. By means of a loop, the selected node of the last tree level now travels through the tree until it reaches the root node and, in the process, the stored connecting routes are selected For this purpose, it is always checked in query 109 whether the path point is larger than path point 1. As long as it is, the traveling through the loop will continue, and in Step 110, the connecting route of the connecting route leading to the respectively observed node will be selected by way of the stored reference to the predecessor.

If, for example, node 13.2 was selected in Step 107, the stored connecting route with the reference III between path point 2 and path point 3 is first selected in Step 110. By means of the stored reference, the predecessor of the previously observed node can also be determined in Step 111. This predecessor is now defined in Step 111 as the currently observed node. Node 12.2 is obtained for the above-described example. The path point index is reduced by 1 in Step 112. During the next loop passage, the connecting route leading to the currently observed node will now be selected in Step 110. For the above-described example, the connecting route with index II leading to the currently observed node 12.2 will now be obtained.

When all connecting routes from the selected node of the last level to the root node have been selected, the process will end in Step 113.

The process according to the invention has the advantage that, because time allowances are taken into account when constructing the tree, several time allowances within a route can be met at the lowest possible cost. The computing time is minimized because, in each case, only the route combinations between two path points are computed. Computation of the connecting routes is not necessary because the process is based on this already known information.

The process according to the invention therefore permits an automatic route computation while taking into account one or more path points with the simultaneous minimization of costs. The invention therefore permits a vehicle route planning that optimized with respect to computing time and cost, and takes into account time allowances at path points.

In addition to the use for aircraft, the process according to the invention can also be used for other vehicles, such as automobiles, rail vehicles or the like. However, the computing expenditures for determining a connecting route for an aircraft are particularly high because there is the additional degree of freedom of the flight altitude and typically no fixed predefined routes (roads), and therefore, the process according to the invention can used in a particularly profitable manner in the case of aircraft.

Figure 4:
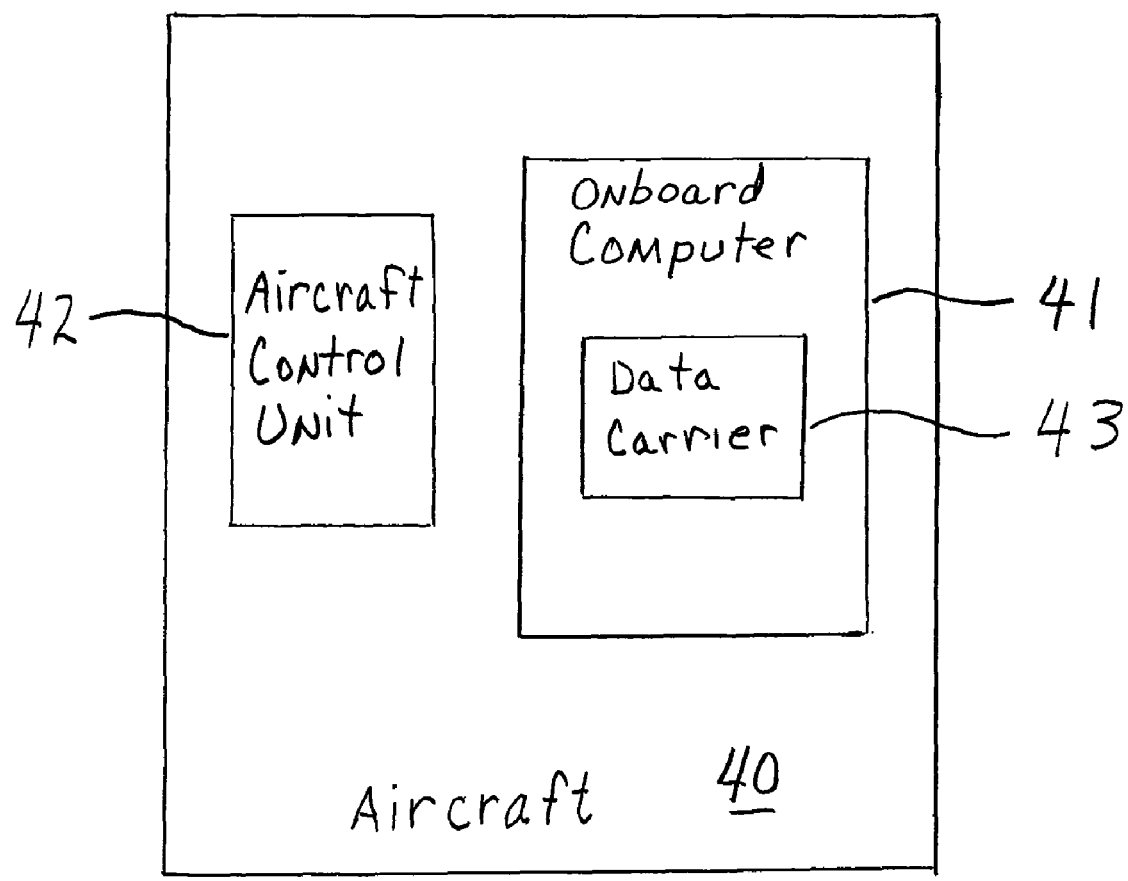
FIG. 4 shows a system for implementing the process illustrated in FIGS. 1-3.

The invention also provides a system for performing the route selection process described above. As shown in FIG. 4, such a system may, for example, be part of an onboard computer 41 of an aircraft 40 (such as an airplane, a drone, a helicopter or a missile). The route determined by the system can be used as an input variable of the control unit 42 of the aircraft, for example, for controlling the autopilot.

In addition, the invention also provides a data carrier 43 containing data of computed connecting routes between several path points (preferably more than two path points). Based on this data carrier, the route determination can then be carried out as described above. An aircraft preferably has a device for reading out this data carrier.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

LIST OF REFERENCE NUMBERS

1 to 5 Path points
6, 7 Radars
8, 9 No-fly zones
11.1 Root node
12.1-12.3 Nodes of the second level
13.1-13.5 Nodes of the third level
100-113 Steps of the flow chart

What is claimed is:

1. A process for determining a route along at least three mutually consecutive preset path points with connecting routes in-between; wherein a plurality of connecting routes is given between at least a pair of mutually consecutive path points, and respective costs are assigned to each connecting route; said method comprising:

generating a tree comprising edges, as well as nodes that are connected by edges, each node being assigned to a defined path point and each edge corresponding to a connecting route; and determining the route based on a selection of edges of the tree, wherein
said tree has a plurality of tree levels on which the nodes are distributed;
the nodes of a tree level are assigned to a common path point; and
different nodes of a tree level are assigned to different values of a characteristic of a path point.

2. The process according to claim 1, wherein:
each connecting route has a time duration assigned thereof; and
different nodes of a tree level are assigned to different time data.

3. The process according to claim 2, wherein, for at least a plurality of nodes in each case, a node-specific time indication, node-specific costs and a reference to a node preceding in the tree are stored.

4. The process according to claim 3, wherein, for at least a plurality of nodes, in each case, the following are stored:
a total time duration from a reference point to the respective node as a node-specific time indication; and
the total costs from the reference point to the respective node as node-specific costs.

5. The process according to claim 3, wherein the stored reference references refers to a preceding node by which the time indication is reached at the lowest cost.

6. The process according to claim 5, wherein the reference comprises a connecting route index.

7. The process according to claim 1, wherein the tree is generated iteratively.

8. The process according to claim 1, wherein:
the tree is generated iteratively; and
in an iteration, combinations of the individual node-specific time indications of a path point and the connecting routes to a following path point in the tree are determined which have the lowest node-specific costs in the case of identical resulting time indications.

9. The process according to claim 1, wherein:
the tree is generated iteratively; and
in an iteration, nodes of a path point following in the tree are determined by combining the nodes of a path point with the connecting routes to form the path point that follows;
wherein the nodes of the path point that follows have the lowest node-specific costs for the individual time indications.

10. The process according to claim 1, wherein a time demand exists for at least one of the path points.

11. The process according to claim 2, wherein:
a time demand exists for at least one of the path points; and
at least one node of a path point, which is characterized by its time indications, is selected as a function of time demand.

12. The process according to claim 11, wherein the tree is continued only by the selected at least one node of a path point.

13. The process according to claim 3, wherein the step of determining the route comprises:
selecting a node of a level of the tree which is the last for which there is a time demand;
wherein the selection takes place by comparing the time demand with time indications of the nodes.

14. The process according to claim 13, wherein the step of determining the route further comprises selecting the edges from the selected node to the root node, utilizing stored references.

15. The process according to claim 1, wherein the route of a vehicle is determined.

16. A system for determining a route along at least three mutually consecutive preset path points with connecting routes in-between; wherein a plurality of connecting routes is given between at least a pair of mutually consecutive path points, and respective costs are assigned to each connecting route, said system comprising:
- means for generating a tree comprising edges and nodes connected by edges, wherein each node is assigned to a defined path point and each edge corresponds to a connecting route; and
- means for determining the route based on a selection of edges of the tree,
- wherein
  - said tree has a plurality of tree levels on which the nodes are distributed;
  - the nodes of a tree level are assigned to a common path point; and
  - different nodes of a tree level are assigned to different values of a characteristic of a path point.

17. An onboard computer of a vehicle comprising the system according to claim 16.

18. A process for determining a route along at least three mutually consecutive preset path points; said process comprising:
- determining connecting routes between a first pair of path points independently of a determination of other connecting routes between other pairs of path points; and
- determining the route based on the connecting routes of the at least three mutually consecutive path points, wherein the first pair of path points each comprise a plurality of nodes of a tree level of a tree that includes the connecting routes and the first and other pair of path points.

19. The process according to claim 18, further comprising:
- newly determining connecting routes between the first pair of path points; and
- newly determining the route based on the newly determined connecting routes.

* * * * *